United States Patent [19]

Smith

[11] Patent Number: 5,492,375
[45] Date of Patent: Feb. 20, 1996

[54] DRILL PIPE WITH IMPROVED CONNECTORS

[75] Inventor: Jackie E. Smith, Houston, Tex.

[73] Assignee: Grant TFW, Inc., Houston, Tex.

[21] Appl. No.: 278,419

[22] Filed: Jul. 21, 1994

[51] Int. Cl.⁶ ..................................... F16L 25/00
[52] U.S. Cl. ............................................... 285/334
[58] Field of Search .................................. 285/333, 334

[56] References Cited

U.S. PATENT DOCUMENTS

| | | |
|---|---|---|
| 4,548,431 | 10/1985 | Hall et al. . |
| 4,946,201 | 8/1990 | Tai ..................................... 285/334 X |
| 5,044,676 | 9/1991 | Burton et al. ............................ 285/334 |
| 5,064,224 | 11/1991 | Tai ..................................... 285/334 X |
| 5,154,452 | 10/1992 | Johnson .................................. 285/333 |
| 5,169,183 | 12/1992 | Hallenz .................................. 285/334 |

*Primary Examiner*—Terry Lee Melius
*Assistant Examiner*—Heather Chun Shackelford

*Attorney, Agent, or Firm*—Browning, Bushman, Anderson & Brookhart

[57] ABSTRACT

A tubular drill pipe having a pin connector at one end and a box connector at the other end has each connector adapted to mate with a connector similar to that at the opposite end of the pipe—but on another pipe, to form a tool joint. The connectors are of the type having two pair of axially abutting make-up faces: a primary annular shoulder formed at the inner end of the base of the pin connector, which mates with the end face of the box connector to form a first such pair; and an internal secondary shoulder at the inner extremity of the base of the box connector which abuts the end of an outermost nose section of the pin connector. The (a) length of the threaded section of the pin, (b) the transverse cross-sectional area of the pin nose, and the smaller of (c) the transverse cross-sectional area of the box counterbore section, and (d) the transverse cross-sectional area of the last engaged thread of the pin are correlated, so that the torsional strength of the joint is approximately equally dependent on each of (a), (b) and the smaller of (c) or (d).

5 Claims, 1 Drawing Sheet

DRILL PIPE WITH IMPROVED CONNECTORS

BACKGROUND

The present invention pertains to the connectors, i.e. the pins and boxes, of tubular drilling members such as drill pipe or drill collars. It is especially applicable to the type of drill pipe generally described in U.S. Pat. No. 4,548,431 to Hall et al, and represents an improvement thereover.

Such a pipe has a pin connector at one end and a box connector at the other end, each connector being adapted to mate with a connector similar to that at the opposite end of the pipe—but on another pipe, to form a tool joint. The type of pin connector in question comprises a pin tong section of relatively large outer diameter; a pin base section outwardly adjacent the pin tong section and of smaller outer diameter, whereby a primary, generally axially facing, annular shoulder is defined between the pin tong and pin base sections; a tapered threaded section outwardly adjacent the pin base section; and a pin nose section outwardly adjacent the threaded section and of smaller diameter (by a value $c_1$) than the small end of the threaded section, the pin nose section having an annular pin end face. The box connector comprises an internal, generally axially facing, annular secondary shoulder sized to align with the pin end face of a similar pipe in a tool joint, a box base section of relatively small diameter outwardly adjacent the secondary shoulder and sized to receive the pin nose section; a tapered threaded section outwardly adjacent the box base section and adapted to mate with the threaded section of the pin connector; a box counterbore section outwardly adjacent the threaded section of the box connector, of larger inner diameter than the trough of the largest thread of the box connector, and sized to receive the pin base section, the box counterbore section having an annular box end face sized to align with the primary shoulder on the pin connector.

The pipe described in the Hall et al patent is designed to form tool joints which can withstand higher torque loading than conventional tool joints. The analysis reflected in this prior patent was largely limited to the stresses and spring-like qualities of the pin base, the box counterbore section and the pin nose. Although testing and finite element analysis were conducted as a means to confirm the accuracy of the stress analysis, and did not reveal any potential problems, at least one thread failure of this type of pipe during service indicated that the torsional strength of the connection can be limited by the length of the threaded sections. However, the geometry of the joint is such that the diameter of the pin nose section, which also effects the torsional strength, is decreased as the thread length is increased, thus creating a sort of dilemma.

It was discovered by later tests that, when joints were designed with the thread length adequate for the smallest anticipated inside diameter, the cross-sectional area of the pin nose at the largest inner diameter available was too small. Larger inside diameters produced a pin nose with inadequate strength compared to the pin base, the box counterbore section and the threads. In other words, the joint was not "balanced."

SUMMARY OF THE INVENTION

The present invention is directed at the problem of maximizing the torsional strength of a joint, and also ensuring that the initial failure mode will be buckling of the pin nose and box counterbore, rather than shearing of the threads. While buckling of the pin nose and box counterbore is to be avoided, it is not catastrophic in that it will not ordinarily cause the drill string to part. However, if there is a thread failure, the drill string is likely to part, causing very severe problems indeed.

The present invention accomplishes these objectives by correlating (a) the length of the threaded section of the pin, (b) the transverse cross-sectional area of the pin nose, and the smaller of (c) the transverse cross-sectional area of the box counterbore, or (d) the transverse cross-sectional area of the last engaged thread of the pin, so that the torsional strength of the tool joint is approximately equally dependent on factors (a), (b) and the smaller of factors (c) and (d) above.

More specifically, these conditions can be satisfied when:

$$A_t \geq 1.73(A_L + A_N)$$

where:

$A_t$=thread shear area $A_L$=transverse area of smallest last engaged thread $A_N$=transverse area of pin nose section The connectors may advantageously incorporate and/or improve on other features of the prior connectors over which they improve. For example, the lengths and thicknesses of the box counterbore, pin base, box base, and pin nose sections are preferably selected so that, when a tool joint is made up to at least one half, and preferably 60%, of its yield strength, the box end face will tighten against the primary shoulder at a force greater than any force being exerted by the pin end face against the secondary shoulder, with the pin end face tightening against the secondary shoulder if additional torque is encountered during drilling. Likewise, the outer diameter of the box connector may be reduced along the box counterbore section to provide the necessary deflectability in that area.

Still other features and advantages of the invention will be made apparent by the following detailed description, the drawing, and the claims.

DETAILED DESCRIPTION

Figure 1:
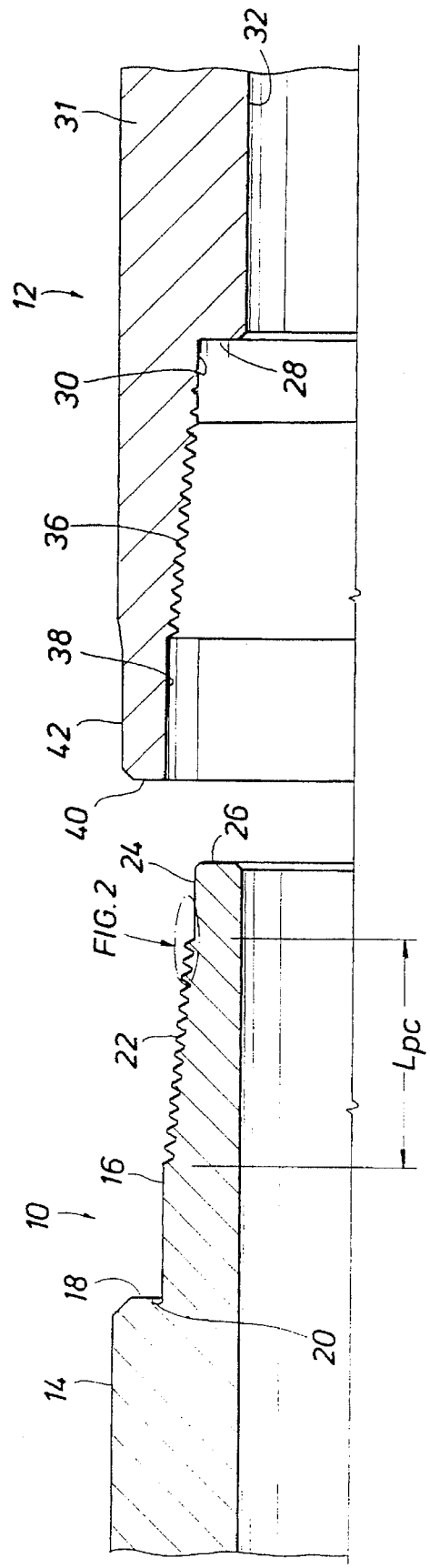
FIG. 1 is a longitudinal quarter sectional view of pin and box connectors according to the present invention in position for mating to make up a tool joint.

Referring to FIG. 1, there is shown the pin connector 10 of one piece of drill pipe in position for mating connection to the box connector 12 of another piece of drill pipe. It should be understood that the drill pipes are identical. Therefore, the pipe carrying pin connector 10 has a box connector similar to 12 at its other end; likewise the pipe carrying the box connector 12 has a pin connector similar to 10 at its other end. Except for the improvements described hereafter, the connectors 10 and 12 may be generally of the type disclosed in prior U.S. Pat. No. 4,548,431, which is incorporated herein by reference.

The pin connector 10 has an enlarged diameter tong section 14. (In the case of a drill collar, the tong section outer diameter is equal to that of the central section between tool joints.) Axially outwardly adjacent tong section 14 is a cylindrical pin base section 16. Section 16 is of smaller transverse dimension, more specifically smaller outer diameter, than section 14, whereby a primary annular, generally axially facing shoulder 18 is formed between sections 14 and 16. ("Generally axially facing" herein will mean that the direction in which the surface faces has a significant axial vector component. In the embodiment illustrated, shoulder 18 is strictly axially facing, i.e. no other vector components.) The outer edge of shoulder 18 may be beveled, as shown, and at the inner extremity of shoulder 18, there may be provided a relief groove 20, as explained in prior U.S. Pat. No. 4,548,431. Axially outwardly of pin base section 16 is the tapered threaded section 22 of the pin connector. The length of section 22, which will be designated $L_{pc}$, is shown in FIG. 1. Axially outwardly of threaded section 22 is a pin nose section 24 which is cylindrical, and has a smaller outer diameter than the small end of the threaded section 22 by a value $c_1$ (see $c_1/2$ in FIG. 2). The outer end of nose section 24 defines an axially facing annular pin end face 26, the corners of which may be beveled as shown.

The box tong section 31 has a reduced inner diameter 32 equal to the inner diameter of the pin. Box connector 12, at the outer end of section 32, has an internal, annular, axially facing secondary shoulder 28 sized to align with the pin end face 26 and to abut the pin end face 26 when the tool joint is sufficiently torqued up. Outwardly adjacent to the shoulder 28 is a cylindrical box base section 30 of larger inner diameter than the main body 32, whereby shoulder 28 is formed. The inner edge of shoulder 28 may be beveled, as shown. Box base section 30 is sized to receive the pin nose section 24.

Axially outwardly adjacent the box base section 30, is the tapered threaded section 36 of the box connector, which is adapted to mate with threaded section 22 of the pin connector.

Axially outwardly of the threaded section 36, is a box counterbore section 38 of larger inner diameter than the trough of the largest thread of the box connector, and sized to receive the pin base section 16. The end of the box counterbore section 38 forms an annular axially facing box end face 40 sized to align with the primary shoulder 18 and to abut shoulder 18 when the joint is made up.

When the joint is made up, the axial force at abutting surfaces 18 and 40 will be greater than any such force at opposed surfaces 26 and 28 (which may or may not abut prior to the application of additional torque during use). More specifically, the joint is usually made up to at least about one half of its yield strength, and preferably to about 60%, and in that condition, the force at faces 18 and 40 will be greater than the force (if any) at faces 26 and 28. If additional torque is encountered during drilling, faces 26 and 28 may further tighten against each other, but preferably not to a force exceeding that at faces 18 and 40.

As explained more fully in U.S. Pat. No. 4,548,431, these ends are accomplished by proper selection of the lengths and thicknesses of the box counterbore 38, pin base 16, box base 30, and pin nose 24 sections. It is noted, in particular, that for purposes of adjusting these relative lengths and thicknesses, the thickness of the box counterbore section 38 may be reduced by reducing its outer diameter as indicated at 42. This may allow the necessary compression of the box counterbore section, as the enclosed pin base section 16 stretches, in tightening end face 40 against the primary shoulder 18. The aforementioned correlation of lengths and thicknesses of the various sections can be done, for example, as per the teachings of prior U.S. Pat. No. 4,548,431.

Indeed, the apparatus, as thus hr described, is largely in accord with prior U.S. Pat. No. 4,548,431, and may also incorporate other details described therein, such as bench mark shoulders.

While the features thus far described have been generally successful in allowing tool joints to handle higher torques, and achieve other effects described in prior U.S. Pat. No. 4,548,431, at least one thread failure was experienced during service of such pipe, which indicated that the torsional strength of the connection could be limited by the length of the threads. However, the geometry of the connection is such that the diameter of the pin nose section, which also effects torsional strength, is decreased as the thread length is increased. It was found, by further testing, that when connections were designed with the thread length adequate for the smallest anticipated inside diameter, the cross-sectional area of the pin nose section at the largest diameter available was too small. Larger inside diameters produced a pin nose with inadequate strength compared to the pin base section, the box counterbore section, and the threads. In other words the connection was not balanced.

The improvements of the present invention optimize the thread length and nose diameter for any given inside diameter, thus maximizing the torsional strength of the connection. These improvements also ensure that the initial failure mode will be buckling of the pin nose section and box counterbore section, rather than shearing of the threads. This is important since buckling of the pin nose section and box counterbore section are generally not catastrophic; the drill string will not part because of such buckling. However, a thread failure is likely to cause the drill string to part, resulting in extreme difficulties and expense.

Thus, in accord with the present invention (a) the length of the threaded section of the pin, (b) the transverse cross-sectional area of the pin nose, and the smaller of (c) the transverse cross-sectional area of the box counterbore section, or (d) the transverse cross-sectional area of the last engaged thread of the pin ("last engaged thread" hereafter) are correlated so that the torsional strength of the tool joint is approximately equally dependent on each of factors (a), (b) and the smaller of (c) or (d).

Figure 2:
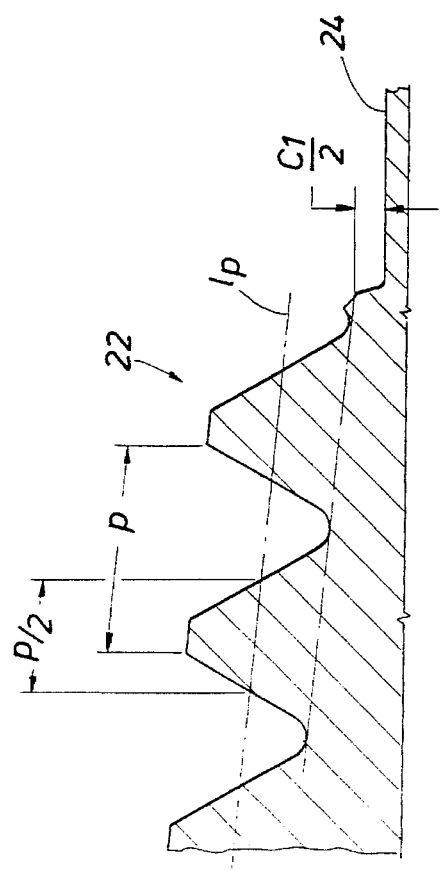
FIG. 2 is an enlarged detailed view of the area encircled in FIG. 1.

One method of achieving this is to design the connectors so that:

$$A_t \geq 1.73(A_L + A_N) \qquad (I)$$

where:

$A_t$=thread shear area $A_L$=transverse area of last engaged thread $A_N$=transverse area of pin nose section The concept of $A_t$, or thread shear area is best understood by reference to the enlarged thread profile shown in FIG. 2. The pitch of the thread profile shown is the length P measured from a point on one thread to the analogous point on the next adjacent thread. The pitch line $1_p$ is a line parallel to the thread crest through the part of the thread where its thickness is equal to half of the pitch, i.e. P/2. This pitch line is approximately where the thread would shear if shearing were to occur. At, the thread shear area is the thickness of the thread at the pitch line $1_p$ multiplied by the total length $L_t$ of the thread at the pitch line $1_p$, i.e. as if the helical thread were straightened and measured as a straight linear distance.

One way of determining parameters which satisfy relationship (I), is to begin by postulating relationship (I) as an equation:

$$A_t = 1.73(A_L + A_N), \qquad (II)$$

then solving that equation, which may be done by using the following equations:

$$A_t = L_{pc} \pi R_t \quad \text{(III)}$$

where $R_t$ = mean thread radius $$A_L = \frac{\pi}{4} \left\{ \left[ c - 2\left(\frac{H}{2} - S_{RS}\right) - \frac{T}{q} \right]^2 - d^2 \right\} \quad \text{(IV)}$$

where c=pitch line diameter at a chosen gauge point between the last engaged thread and the shoulder 18 q=the distance between the gauge point and the last engaged thread

H=untruncated thread height $S_{RS}$=radial dimension of root truncation

T=taper (in inches/ft.)

d=inside diameter (32 in FIG. 1)

$$A_n = \frac{\pi}{4} (D_n^2 - d^2) \quad \text{(V)}$$

where (VI) $D_n$=nose diameter $$= c - 2\left(\frac{H}{2} - S_{RS}\right) - \frac{L_{pc}T}{12} - c_1$$

(Note: $c_1$ is derived from $c_1/2$ [FIG. 3] for the full diameter of the member)

After solving all of the above, about ¼ in. is added to $L_{pc}$, satisfying the ">" aspect of relationship (I) and ensuring that failure will not be by thread shearing.

It will be understood that relationship (I) is set up in terms of areas. Each of these areas, of course, is functionally related to other variables, such as corresponding diameters. Thus, other equivalent relationships can be extrapolated, expressed in terms of different variables. However, a connector design which complies with any such equivalent relationship should also comply with the relationship (I).

An alternate technique for designing a tool joint with the proper correlation between parameters so that the torsional strength of the tool joint is approximately equally dependent on each of those parameters, is by an iterative process.

More specifically, one would iterate by following these steps:

1. Start with a small inner diameter for the size pipe in question. (This will produce a relatively large value for $A_N$).
2. Choose a first outer diameter for the pin nose section, and calculate the needed thread length $L_{pc}$ based on that diameter using the following relationship:

$$L_{pc} \pi R_t - 1.73(A_L + A_N) = 0 \quad \text{(VII)}$$

3. Using the thread length $L_{pc}$ obtained in step 2, recalculate (or determine graphically) a new outer diameter for the pin nose section using relationship (VI).
4. Using the new nose diameter obtained in step 3, recalculate the necessary thread length by repeating step 2.
5. Continue to alternate these steps until the nose diameter and thread length reach equilibrium, or near equilibrium, i.e. when the solution to equation (VII) is 0+ applicable tolerance range, as understood by those in the art.

Various modifications of the above embodiments are within the skill of the art and the scope of the invention, which is limited only by the following claims.

What is claimed is:

1. A tubular drilling member having a pin connector at one end and a box connector at the other end, each connector being adapted to mate with a connector similar to that at the opposite end of the drilling member—but on another such member, to form a tool joint;

the pin connector comprising:
   a pin tong section of relatively large outside transverse dimension;
   a pin base section axially outwardly adjacent the pin tong section and of smaller outside transverse dimension, whereby an external, annular, generally axially facing primary shoulder is defined between the pin tong and pin base sections;
   a tapered threaded section axially outwardly adjacent the pin base section, having an outermost small end and an innermost large end;
   a pin nose section axially outwardly adjacent the threaded section and of smaller outer diameter than the small end of the threaded section, the pin nose section having an annular pin end face;

the box connector comprising:
   an internal, generally axially facing, annular secondary shoulder sized to align with such pin end face in such tool joint;
   a box base section axially outwardly adjacent the secondary shoulder and sized to receive such pin nose section;
   a tapered threaded section axially outwardly adjacent the box base section and adapted to mate with the threaded section of such pin connector;
   a box counterbore section axially outwardly adjacent the threaded section of the box connector, of larger inner diameter than the trough of the largest thread of the box connector, and sized to receive such pin base section; the box counterbore section having an annular box end face sized to align with the primary shoulder;

wherein (a) the length of the threaded section of the pin, (b) the transverse cross-sectional area of the pin nose, and the smaller of, (c) the transverse cross-sectional area of the box counterbore section, or (d) the transverse cross-sectional area of the last engaged thread of the pin are such that torsional strength of such tool joint is approximately equally dependent on each of (a), (b) and the smaller of (c) or (d).

2. The apparatus of claim 1, wherein:

$$A_t \geq 1.73(A_L + A_N)$$

where:

$A_t$=thread shear area $A_L$=transverse area of last engaged thread $A_N$=transverse area of pin nose section.

3. The apparatus of claim 2, wherein the outer diameter of the box connector is reduced along the box counterbore section.

4. The apparatus of claim 2, wherein the lengths and thicknesses of the box counterbore, pin base, box base and pin nose sections are selected so that, when such tool joint is made up to 60% of its yield strength, the box end face will tighten against the primary shoulder to a force greater than any force being exerted by the pin end face against the secondary shoulder, with the pin end face tightening against the secondary shoulder if additional torque is encounter during drilling.

5. The apparatus of claim 4, wherein the outer diameter of the box connector is reduced along the box counterbore section.

\* \* \* \* \*